Dec. 19, 1922.

F. W. HANLEY.
ANTISKID DEVICE.
FILED NOV. 7, 1921.

1,439,548.

F. W. Hanley, INVENTOR

BY Victor J. Evans

ATTORNEY

Patented Dec. 19, 1922.

1,439,548

UNITED STATES PATENT OFFICE.

FRANK W. HANLEY, OF PITTSBURGH, PENNSYLVANIA.

ANTISKID DEVICE.

Application filed November 7, 1921. Serial No. 513,524.

*To all whom it may concern:*

Be it known that I, FRANK W. HANLEY, a citizen of the United States, residing at Pittsburgh, in the county of Allegheny and State of Pennsylvania, have invented new and useful Improvements in Antiskid Devices, of which the following is a specification.

This invention relates to anti-skid devices, and more particularly to a device adapted to cause the rear wheels of an automobile to be lifted from the traction surface in the event that the automobile starts to skid, the device also serving to provide a braking effect.

One of the main objects of the invention is to provide a device of the character stated of simple construction and operation which may be readily applied. A further object is to provide a device which, when in operation, presents increasing resistance to travel of the automobile so as to avoid bringing the same to a stop too suddenly. Further objects will appear from the detailed description.

In the drawings:—

Figure 1:
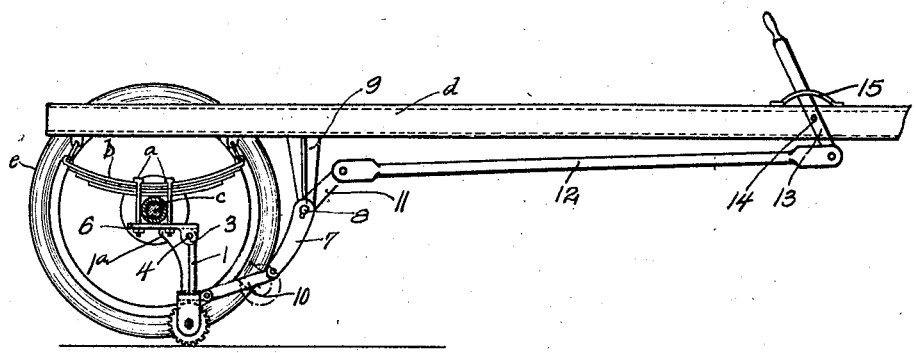
Figure 1 is a side view of the device as applied.

The device includes two arms 1 which are connected by a bar 2 so as to be held in parallel spaced relation. Each arm is provided at its upper end with a head 3 pivotally secured by a pin 4 between ears 5 which depend from a clamping plate 6, this plate receiving U-bolts $a$ which pass over rear spring $b$ of the automobile so as to secure the spring to axle housing $c$ in known manner. An arm 7 is secured on a shaft 8 which is rockably mounted in a bracket 9 depending from chassis $d$ of the automobile. This arm is connected by a link 10 to bar 2. A second arm 11 is secured to shaft 7 and is connected by a rod 12 to the lower end of an operating lever 13 pivoted at 14 on the chassis, this lever being held in adjustment by a rack 15 in a known manner. When lever 13 is moved into forward position bar 2 is raised so as to hold the device in inoperative position above the traction surface.

Figure 2:
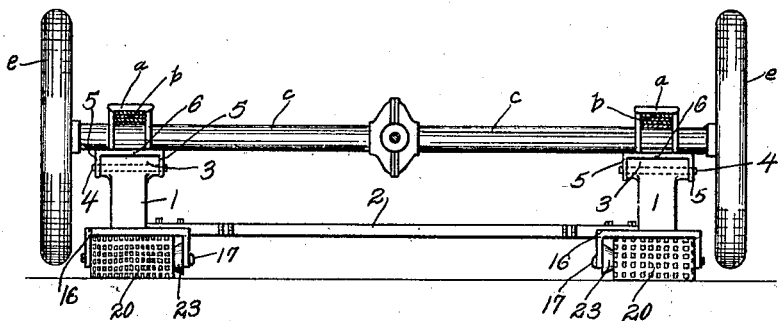
Figure 2 is a front view.
Figure 3:
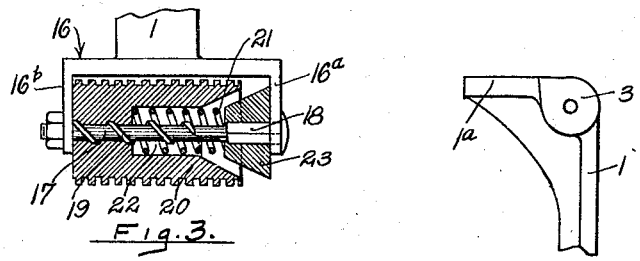
Figure 3 is a section through one of the rollers and associated parts.
Figure 4:
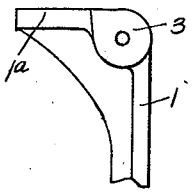
Figure 4 is a fragmentary detail of one of the supporting arms.

Each arm 1 is provided, at its lower end, with a U-shaped frame 16 through the arms of which is secured a shaft 17, this shaft being provided at one end with a squared portion 18 which fits snugly through a corresponding opening in arm 16$^a$ of frame 16. Shaft 17 is provided for the greater portion of its length with a squared thread 19 of great pitch. A knurled roller 20 is mounted upon the threaded portion of the shaft and is normally held adjacent to arm 16$^b$ of frame 16 by an expansion coil spring 21 which fits into a central recess 22 in the inner end of the roller, this spring being confined between the roller at the outer end of this recess, and the inner end of a cone 23 secured upon squared portion 18 of shaft 17. In the event that the automobile starts to skid, lever 13 is moved into the position illustrated in Figure 1 thus lowering the device and permitting rollers 20 to contact with the traction surface. This serves to swing arms 1 into vertical position, these arms being of such length as to raise the rear wheels $e$ of the automobile out of contact with the traction surface, when the arms are in vertical position, as illustrated in Figures 1 and 2. Rearward movement of arms 1 beyond vertical position is prevented by elements 1$^a$ which extend rearwardly from the upper ends of the arms and are positioned to contact with plates 6, these elements merging into and reinforcing arms 1. Continued forward travel of the automobile causes rotation of rollers 20 upon shafts 17 so as to force the rollers toward cones 23, this movement of the rollers being resisted by the springs 21, the resistance increasing in accordance with movement of the rollers toward the cone members 23. This exerts a decided braking effect upon forward travel of the automobile, and when the rollers 20 contact with cones 23 they are locked against further rotation, the rollers biting into the traction surface and serving to effectually stop forward travel of the automobile. After the automobile has been thus stopped, the rollers may be moved out of contact with the traction surface by moving lever 13 into forward position. This can be accomplished with but slight effort due to the fact that the axis upon which arms 1 swing is in advance of the axis of wheels $e$. If for any reason this cannot be readily accomplished, pushing the automobile rearwardly a short distance will serve to lower the wheel $e$ into contact with the traction surface, after which the rollers may be readily raised into inoperative position.

What I claim is:—

1. In combination with an automobile, arms pivotally connected to the automobile for movement about an axis extending transversely of the automobile and positioned in advance of the axis of the rear wheels of the automobile, rollers rotatably supported at the lower ends of said arms, the arms being of such length as to cause raising of the wheels out of contact with the traction surface when the arms are in vertical position, means for limiting rearward movement of the arms, and means for presenting increasing resistance to rotation of said rollers.

2. In combination with the axle housing of an automobile, arms connected at their upper ends to said housing for movement about an axis extending transversely of the automobile, rollers rotatably supported at the lower ends of said arms, the arms being of greater length than the normal distance between the axle housing and the traction surface, means for raising and lowering said arms, means for limiting rearward movement of said arms beyond substantially vertical position, and means for resisting rotation of said rollers.

3. In combination with an automobile, arms pivoted at their upper ends for movement about an axis extending transversely of the automobile, said arms being provided at their lower ends with supporting frames, shafts extending through each of said frames and secured against rotation, each of said shafts being provided with a thread of great pitch, rollers threaded on each of the shafts, a cone member secured upon each shaft at one end of the roller, the adjacent end of the roller being recessed to receive said cone member, and means for forcing the roller away from the cone member.

4. In combination with an automobile, arms pivoted at their upper ends for movement about an axis extending transversely of the automobile, said arms being provided at their lower ends with supporting frames, shafts extending through each of said frames and secured against rotation, each of said shafts being provided with a thread of great pitch, rollers threaded on each of the shafts, a cone member secured upon each shaft, at one end of the roller, the adjacent end of the roller being recessed to receive said cone member, and means for forcing the roller away from the cone member and for presenting increasing resistance to movement of the roller toward the cone member.

In testimony whereof I affix my signature.

FRANK W. HANLEY.